4 Sheets—Sheet 1.

W. H. DOANE & W. E. LONDON.

COMBINED PLANING AND MATCHING MACHINE.

No. 6,773. Reissued Nov. 30, 1875.

Attest

Edgar J. Gross

John S. Jones

Inventors

Wm. H. Doane

Wm. E. London

By F. Millward

Atty for

J. M. Taylor & co assignees

4 Sheets—Sheet 2.

W. H. DOANE & W. E. LONDON.

COMBINED PLANING AND MATCHING MACHINE.

No. 6,773. Reissued Nov. 30, 1875.

Inventors

W. H. Doane &

Wm. E. London By

Y. Millward Atty for J. H. Sayles, assignee

Attest

Edgar J. Gross

John S. Jones

4 Sheets—Sheet 3.

W. H. DOANE & W. E. LONDON.

COMBINED PLANING AND MATCHING MACHINE.

No. 6,773. Reissued Nov. 30, 1875.

Attest

Edgar J. Gross

John S. Jones

Inventors

Wm. H. Doane &

Wm. E. London

By Y. Millward

Atty for

W. H. Barber assignee

4 Sheets—Sheet 4.

W. H. DOANE & W. E. LONDON.

COMBINED PLANING AND MATCHING MACHINE.

No. 6,773. Reissued Nov. 30, 1875.

Inventors

Wm. H. Doane

W. E. London

By T. Millward Atty for J. H. Fay & Co. assignees

Attest

Edgar J. Gross

John S. Jones

UNITED STATES PATENT OFFICE.

WILLIAM H. DOANE AND WILLIAM E. LONDON, OF CINCINNATI, OHIO, ASSIGNORS, BY MESNE ASSIGNMENTS, TO J. A. FAY & CO., OF SAME PLACE.

IMPROVEMENT IN COMBINED PLANING AND MATCHING MACHINES.

Specification forming part of Letters Patent No. 36,901, dated November 11, 1862; reissue No. 6,773, dated November 30, 1875; application filed November 11, 1875.

*To all whom it may concern:*

Be it known that we, WILLIAM H. DOANE and WILLIAM E. LONDON, both of Cincinnati, Hamilton county, and State of Ohio, have invented a new and useful Improvement in Combined Planing and Matching Machines; and we do hereby declare that the following is a full, clear, and exact description of the same, reference being had to the accompanying drawings forming part of this specification, in which—

Figure 1:
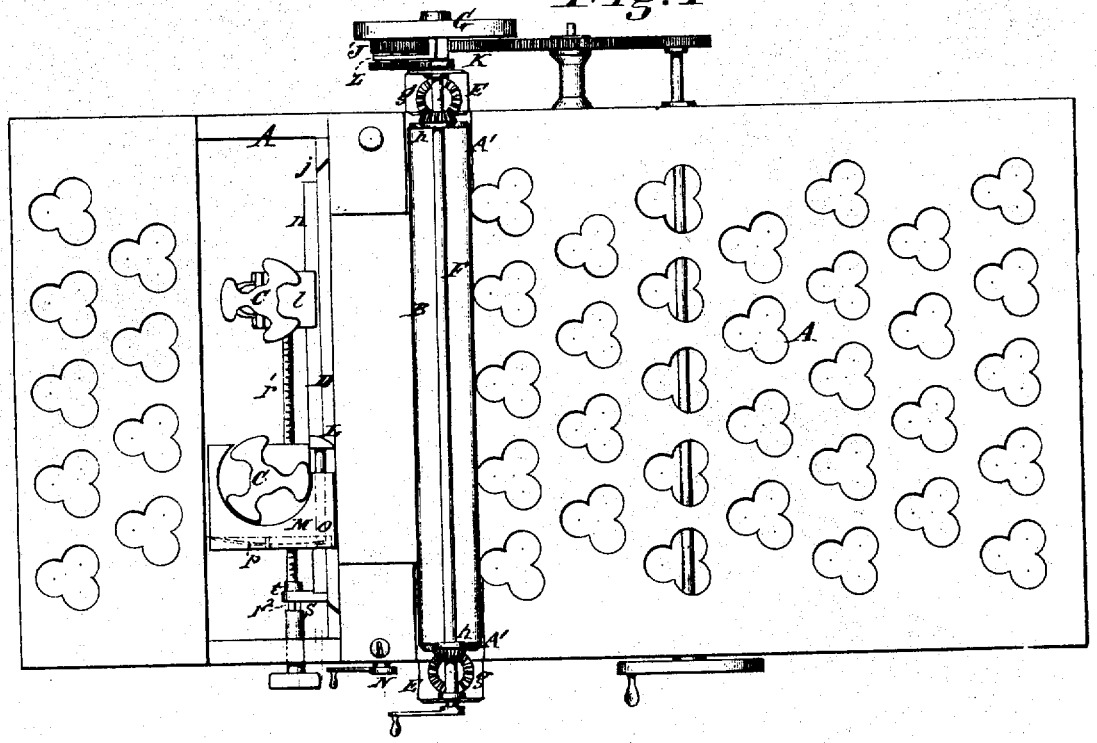
Figure 9:
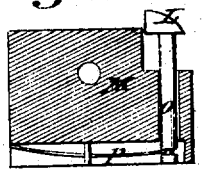
Figure 8:
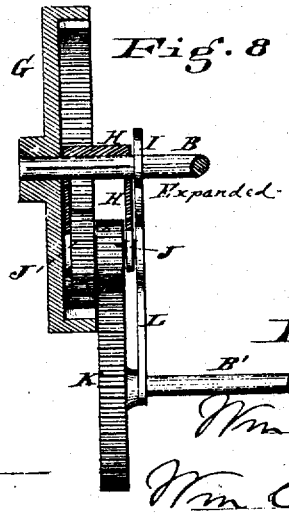
Figure 2:
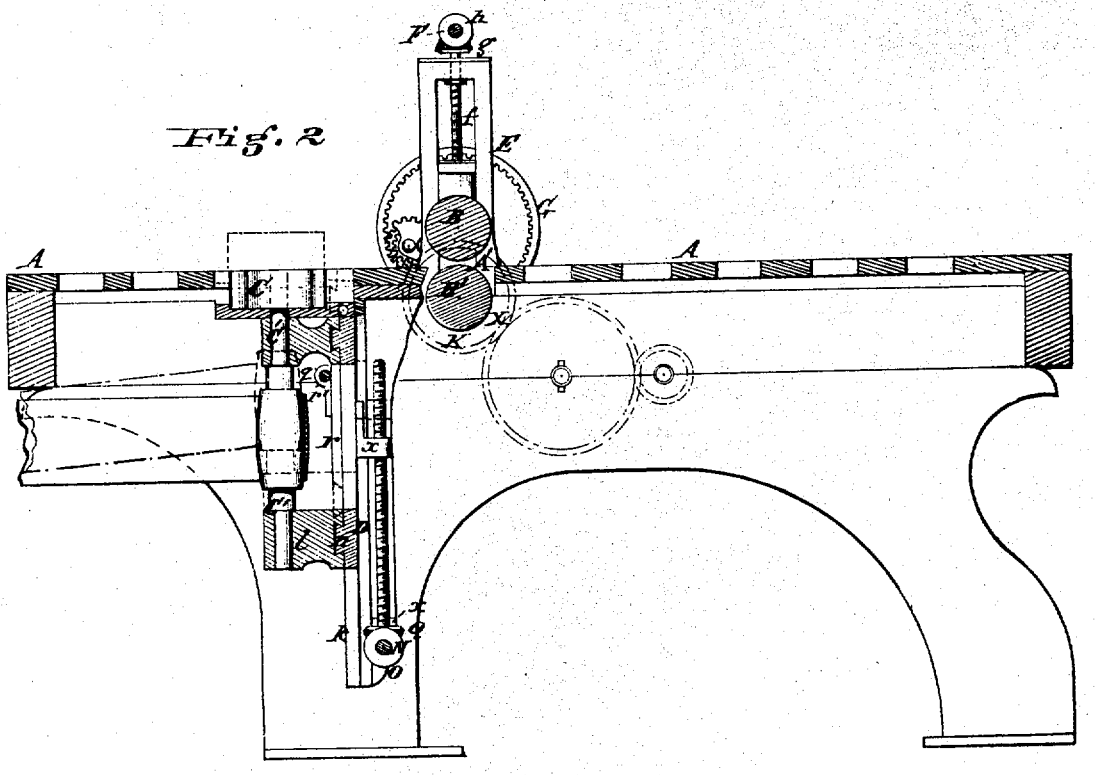
Figure 6:
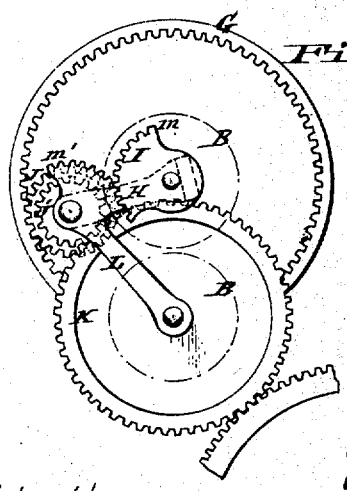
Figure 3:
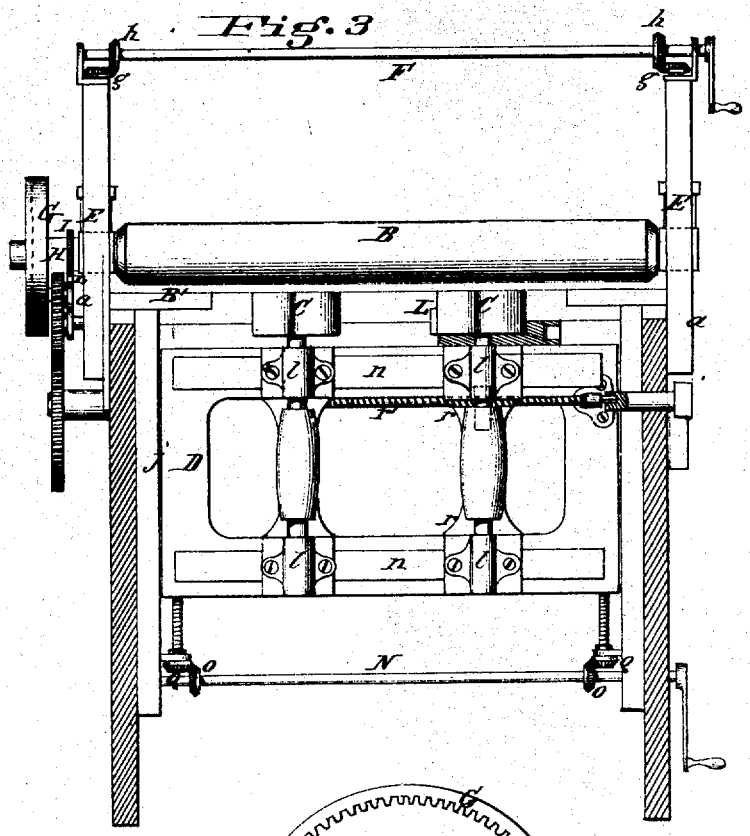
Figure 7:
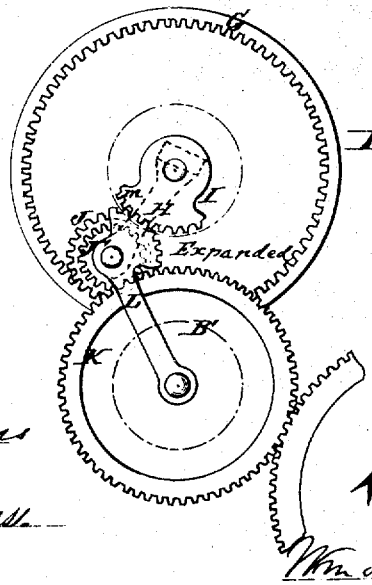
Figure 5:
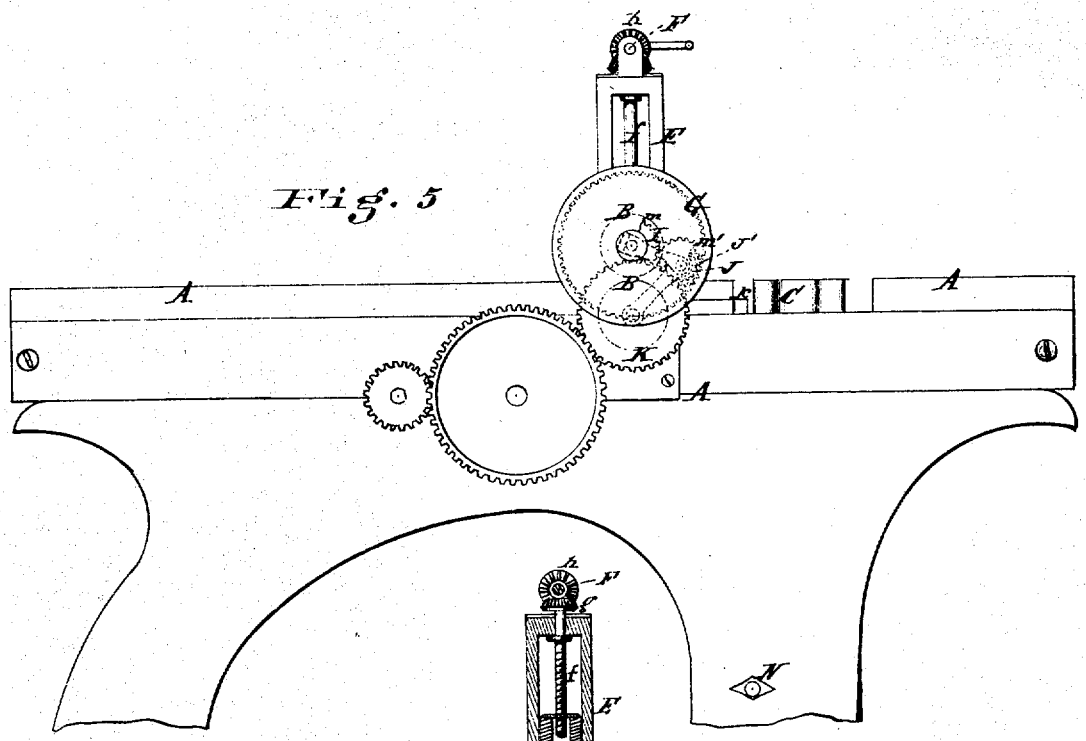
Figure 4:
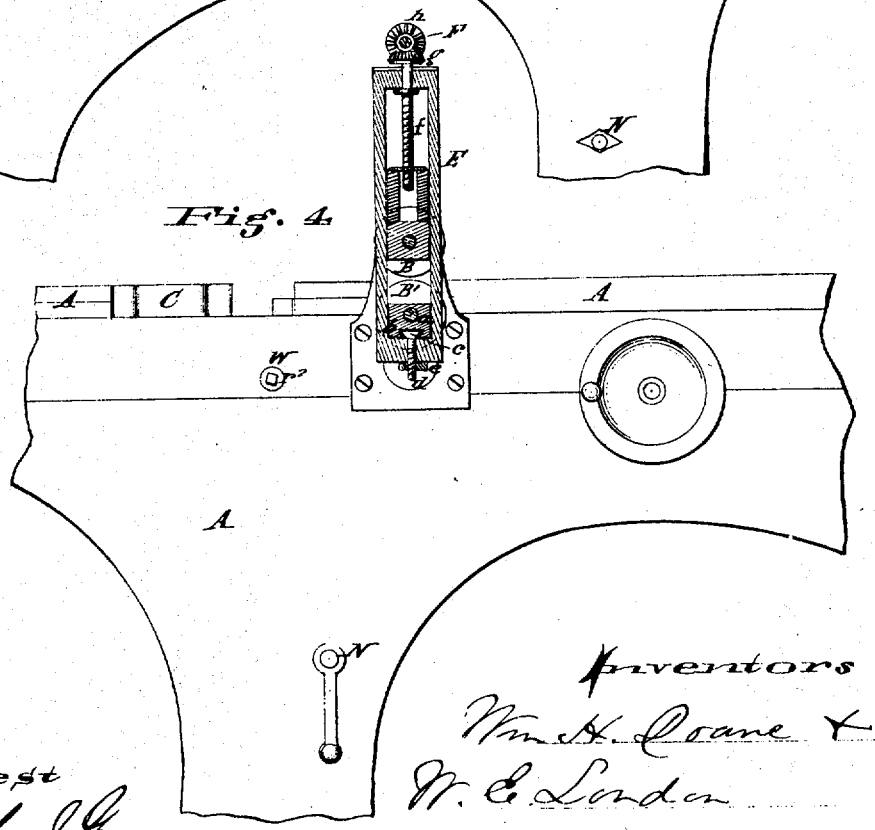

Figure 1 is a plan or top view of a planing-machine frame with my improvements applied to it. Fig. 2 is a vertical longitudinal section of the same; Fig. 3, a vertical transverse section of the same. Fig. 4 is a partial side view and longitudinal section of the same. Fig. 5 is a side elevation of the gearing side of the machine. Figs. 6, 7, and 8 are views of the expansive gearing of the feed-rollers. Fig. 9 is a horizontal section of the head of one of the grooving or tonguing cutter-stocks.

Our invention consists in the first, second, and third parts of improvements upon the combined planing and matching machine patented by Henry D. Storer, July 23, 1871, in which the matching-spindles, which occupy a position above the table or platen when planing and matching simultaneously, or narrow surface-planing alone, is carried on, can be moved or dropped below the surface of the platen or table, when the surfacing of wide boards is desired. The other parts of our improvements are applicable, singly or collectively, as will be hereafter clearly understood, to planing, matching, and combined planing and matching machines in general.

Our improvements consist, first, in combination with the vertically-adjustable matcher-spindles, of a cross-shaft connected thereto, so that the operator stationed outside of the frame of the machine is enabled to conveniently raise or lower said spindles; second, in combination with vertically-adjustable matcher-spindles operated by a cross-shaft leading to the outside of the frame of the machine, of a cross screw-shaft, arranged to be operated also from the outside of the frame of the machine, and operating so as to laterally adjust one of the matcher-spindles relatively to the other; third, in a machine having fixed bed and vertically-adjustable matcher-spindles, adapted to fall below the surface of the table, a main frame, provided with recessed sides, for the occupancy of permanent feed-rolls; fourth, in the provision of a sliding foot and spring, secured to the frame of the matching-spindles, for the purpose of preventing the "clip" to the board in matching; fifth, in a device for fastening the boxes for the lower feed-roller in position, consisting of screws, with dovetailed heads and dovetail slots cut in the under side of the boxes; sixth, in a peculiar arrangement of expansion-gearing, combining geared levers, and operating in a novel and useful manner.

To enable others skilled in the art to make and use our invention, we will proceed to describe the same with reference to the drawings.

A represents the frame and bed of a planing-machine; B B′, the feed-rollers. Upon this frame and bed, in the usual or proper relation to the feed-rollers, planing-works (not shown) are to be arranged. Behind the feed-rollers the tonguing and grooving or matching works C C are arranged upon a vertical sliding bed or frame, D, so as to be raised above the top of the planing-bed, as shown in dotted lines, or to be lowered below the top of said bed, as shown in solid lines, as circumstances may require. The lower feed-roller B′ has its journals fitted in boxes *a a*, and it occupies a position below the slot A′ in the fixed bed, through which it projects, the sides of the frame being recessed at X X below the slot to receive said roller, so that it is permanently located at a convenient distance from the matching mechanism. In the bottom of the boxes *a a* dovetail grooves *b b* are cut, into which dovetail heads *c* of vertical screw-bolts *d* fit snugly. The screw-bolts are extended down through the solid parts of the guide-standards E E of the frame A, and have nuts *e* screwed on their lower ends, so that the roller B′ can be drawn down and held firmly to its proper position. There has been more or less trouble experienced in keeping the boxes of the feed-roller B′ solid and in position. In feeding, the roller turns up, which has a tendency to raise the boxes. To obviate this the boxes of the roller have either been keyed in or confined by set-screws from the side, both of which modes are objectionable. Our plan of casting the dovetail slot or groove in the bottom of the boxes, and inserting a bolt with dovetail head to hold them down, we have used with great success.

The upper feed-roller has its journals fitted in the sliding boxes, which are adjusted up and down in the guide-standards E E by means of screw-rods *f f* and bevel-gears *g g h h*, arranged as shown, and operated by a crank-shaft, F. On the outer end of the journal of the roller E an internally-toothed pulley, G, is arranged, also a swinging bracket or two-armed hanger, H, and a segment-toothed lever, I, which is loosely attached. The swinging bracket carries at its lower end two pinions, J J′, one of which gears with the internal-toothed pulley G, and the other with the intermediate spur-gear K of the ordinary system of spur-gearing. To the shaft or axis of the pinions J J′ a lever, L, is affixed loosely. The lower part of this lever is fitted loosely round the journal of the lower feed-roller B′, while the upper portion is of segment form and toothed, and gears with the teeth of the segment-lever I, as shown. The levers are constructed with a blank tooth and a finger, *m m′*, so that their movement shall be arrested at the proper time.

Our experience with the use of expansion-gearing has proven the comparative worthlessness of the same without the aid of the geared levers. By the combination of the geared levers a twofold object is secured. The intermediate pinions J J′ are kept in a position equidistant from the centers at all times, and in full gear, which relieves them from all strain, and prevents binding or cornering on the other gears. The blank tooth and finger *m m′* of the geared levers act as a check, preventing the feed-roller B from being raised or lowered above or below a certain distance. The bed or frame D, on which the matching-works C C are arranged, has its vertical side edges beveled, as at *j j*, or they may be squared or any other suitable shape; and these edges are fitted to slide freely against the inner beveled or otherwise-shaped edges of two cleats or ways, *k k*, of the frame. The matching-works C C are connected to the frame D by means of dovetails formed in the boxes *l l* of the cutter-shafts C′ C′ and horizontal dovetail cleats *n n*, formed on the back of the frame D. Thus, while the frame moves up and down with the matching-works C C, the matching-works can be moved independently of the frame D in a lateral direction. The matching-works may be of any approved or the ordinary construction, and I secure thereto a horizontal sliding foot, L, arranged in a box, M, with its stem *o* adapted to move at right angles to the line of feed, and bearing against a flat steel spring, *p*, as shown in Figs. 1 and 9 of the drawings. With this provision the board planed comes through the rollers and strikes against the foot first. The foot yields just enough to allow the matching-knives to work free, and yet acts with sufficient force to prevent the end of the board from "skewing" round and being "clipped." The spring is so placed and closed in that the shavings will not be liable to choke it.

The means provided for moving the matching-works apart or together are a screw or nut. The nut *q* is formed on the standard *r* of the boxes *l l*, and the screw $r^1$ extends horizontally through it. The screw has its head $r^2$ square, and is supported and kept from moving laterally by means of a bracket, *s*, and collar *t*. This bracket is formed on, or attached to, the frame D of the matching-works C C, and therefore is inside of the frame A, so also is the square end of the screw. This arrangement or location is preferable, because if the square end of the screw extended outside of the frame A the matching-works could not be raised or lowered unless the frame A was weakened by being made of open or lattice metal, which would form a space for the screw to rise and descend in. To thus obviate the weakening of the frame A we bore a round hole, *w*, through one of its sides, and through this hole insert a "turn-key," with square socket in its end, to receive the square end of the screw $r^1$ whenever it is desirable to set the matching-tools farther apart or nearer together. It is obvious that the screw $r^1$ might be constructed with a right and left thread, so that both tools shall move apart or together simultaneously. The means provided by us for raising and lowering the frame with matching-works are a shaft, N, with two gear-wheels, O O, near its ends, and two rods, P P, connected, by gearing Q Q, to the wheels O O at the lower ends, the essential construction being that the shaft N shall so connect to the matcher-spindles as that the latter may be raised and lowered by the motion of the shaft by an operator stationed conveniently on the outside of the frame of the machine, so that it is not necessary for him to pass into the interior of the frame to vertically adjust these spindles. With this arrangement, by turning the shaft N, the matching-works can readily be adjusted to suit different thicknesses of stuff to be tongued and grooved, thus rendering change of bits unnecessary. Again, if it is desired to plane very wide lumber the spindles C′ C′ can be lowered below the surface or level of the top of the bed of frame A. For ordinary widths of lumber which is being tongued and grooved sufficient lateral adjustment of the matching-works can be effected by the screw $r^1$; but while this is the case it is often necessary to lower the matching-works C C, so as to suit the varying thicknesses of such lumber, and obviate the change in the bits. Our arrangement provides for this necessity, and thus possesses two advantages—viz., it answering for simply planing very wide lumber, and also for planing and tonguing and grooving ordinary widths of lumber of varying thickness without requiring a change in the bits of the matching-works C C, and these changes, owing to the provision of the cross-shafts N $r^1$, can be effected by the workman while standing on the side of the machine.

I claim—

1. In combination with the vertically-adjustable matcher-spindles C′ C′, the cross-shaft N, so connected thereto as that an operator stationed outside of the frame of the machine is enabled to conveniently raise or lower said spindles, substantially as and for the purpose specified.

2. In combination with the vertically-adjustable matcher-spindles C C′, operated by a cross-shaft, N, leading to the outside of the frame of the machine, the cross screw-shaft $r^1$, arranged to be rotated also from the outside of the frame of the machine, and operating to laterally adjust the matcher-spindles relatively to each other, substantially as and for the purpose specified.

3. In a combined planing and matching machine, having fixed bed A A′ and vertically-adjustable matcher-spindles, the main frame provided with recessed sides at X X, for the occupancy of permanent feed-roll B′, substantially as and for the purpose specified.

4. The sliding guard-foot L and its spring *p*, arranged and operating substantially as and for the purpose specified.

5. The combination of the lower feed-roller B′ and its boxes *a*, with dovetail slots *b* in them, with the dovetail-headed screw-bolts *d* and their nuts *e*, the whole arranged and operating substantially as and for the purpose described.

6. The arrangement of the checking-lever segments I L, constructed as described, in combination with the system of expansion-gearing for feed-rollers of a planing-machine, substantially as and for the purposes described.

WILLIAM H. DOANE.
WILLIAM E. LONDON.
By their assignees,
J. A. FAY & CO.

Witnesses:
IRVING SPENCER,
JOHN E. HATCH.